(12) United States Patent
Croxford et al.

(10) Patent No.: US 11,055,820 B2
(45) Date of Patent: Jul. 6, 2021

(54) METHODS, APPARATUS AND PROCESSOR FOR PRODUCING A HIGHER RESOLUTION FRAME

(71) Applicants: Apical Limited, Cambridge (GB); Arm Limited, Cambridge (GB)

(72) Inventors: Daren Croxford, Cambridge (GB); Sean Tristram LeGuay Ellis, Cambridge (GB)

(73) Assignees: Apical Limited, Cambridge (GB); Arm Limited, Cambridge (GB)

( * ) Notice: Subject to any disclaimer, the term of this patent is extended or adjusted under 35 U.S.C. 154(b) by 0 days.

(21) Appl. No.: 16/519,657

(22) Filed: Jul. 23, 2019

(65) Prior Publication Data

US 2020/0082505 A1 Mar. 12, 2020

(30) Foreign Application Priority Data

Sep. 11, 2018 (GB) ...................................... 1814773

(51) Int. Cl.
*G06T 3/40* (2006.01)
*G06T 1/20* (2006.01)

(52) U.S. Cl.
CPC .............. *G06T 3/4053* (2013.01); *G06T 1/20* (2013.01)

(58) Field of Classification Search
CPC ........ G06T 3/4053; G06T 1/20; G06T 1/0007; G06T 3/4023; H04N 7/0135
See application file for complete search history.

(56) References Cited

U.S. PATENT DOCUMENTS

| 5,867,221 A * | 2/1999 | Pullen .................. H04N 19/176 375/240.16 |
| 2003/0142871 A1* | 7/2003 | Ishikawa ............ H04N 21/4335 382/233 |
| 2008/0226186 A1* | 9/2008 | Kodama ................ H04N 19/63 382/243 |
| 2011/0102446 A1 | 5/2011 | Oterhals et al. |
| 2015/0187123 A1 | 7/2015 | Hwang et al. |

OTHER PUBLICATIONS

Combined Search and Examination Report dated Mar. 8, 2019 for United Kingdom Application No. GB 1814773.6.

* cited by examiner

*Primary Examiner* — Said Broome
(74) *Attorney, Agent, or Firm* — EIP US LLP (57) ABSTRACT

A method of producing a full resolution frame, comprising generating a tile representation of the frame. The tile representation comprises a plurality of tiles each associated with an area of the frame. The method also includes eliminating one or more predetermined portions of each tile and rendering retained portions of each tile to produce rendered tiles. The method also transforms the rendered tiles into processed tiles. The full resolution frame is then constructed from the processed tiles.

15 Claims, 5 Drawing Sheets

METHODS, APPARATUS AND PROCESSOR FOR PRODUCING A HIGHER RESOLUTION FRAME

CROSS-REFERENCE TO RELATED APPLICATIONS

This application claims the benefit under 35 U.S.C. § 119(a) and 37 CFR § 1.55 to United Kingdom patent application no. GB1814773.6, filed on Sep. 11, 2018, the entire content of which is incorporated herein by reference.

BACKGROUND OF THE INVENTION

Field of the Invention

The present disclosure relates to a method, apparatus, and display processor for producing frame. More particularly, frames on a tile-based rendering processor.

Description of the Related Technology

Modern displays are often capable of displaying graphics at very high resolutions, for example in 4K (3840×2160 pixels). Generating content for displays with so many pixels is extremely computationally expensive. Furthermore, as consumer electronics development progresses, the use of such displays in mobile computing devices, such as smart phones and tablet computers, means that generating such high-resolution images at a high frequency requires a large number of computing resources, having high power requirements.

Processing data for such displays requires graphics processing units ('GPU') with the necessary memory and processing capabilities to generate and store the large number of rendered pixels. Similarly, for certain applications, it is necessary to compute the pixel values, and render frames quickly and efficiently. Certain applications, such as video games and video players, often require many frames to be rendered per second. It is not uncommon for a video game to operate at around of 60 fps. In the past, where the maximum resolution of a display was 720 p (1280×720 pixels) or 1080 p (1920×1080 pixels) a device would use a graphics processing unit to render information within a frame. Being able to generate and store that many pixels was within the realms of possibility for modern devices. As the resolution of the displays have increased, and as consumers demand higher quality imagery, the amount of processing which the GPU is required to undertake for each frame has increased significantly. This is a particular problem on mobile devices where efficient management of resources, such as processing power and energy are of paramount importance.

Reducing the number of pixels which need to be rendered is one way of reducing the processing power required and as a result the energy requirements of rendering a frame. One such method of doing this is upscaling. When upscaling, a GPU renders a lower-resolution version of a frame, and then duplicates pixels within the lower resolution frame to present it on a display with a higher resolution than what the frame was initially rendered at. For example, a mobile device may render a frame at 720 p and upscale it to 1080 p by scaling, for example by replicating the pixel values for each pixel. However, upscaling often results in a lower-quality image which is not desirable. Similarly, when processing high-resolution frames on mobile devices, some GPUs divide the frame into regions, these GPUs are known as tile or deferred mode GPUs and render each of the regions individually before assembling them into a full frame. Doing this reduces the amount of external memory bandwidth compared to an immediate mode GPU, whilst helping to drive efficiencies and reduce the energy requirements. However, the amount of processing required to render such high-resolution frames is not reduced.

SUMMARY

In the first embodiment, there is provided A method of producing a frame, comprising: generating a tile representation of the frame, wherein the tile representation comprises a plurality of tiles each associated with an area of the frame; eliminating one or more predetermined portions of each tile; rendering retained portions of each tile to produce rendered tiles; transforming the rendered tiles into processed tiles; and constructing the frame from the processed tiles.

In the second embodiment, there is provided an apparatus for producing a frame comprising: a generation module for generating a tile representation of the frame, wherein the tile representation comprises a plurality of tiles each associated with an area of the frame; an elimination module for eliminating one or more predetermined portions of each tile; a rendering module for rendering retained portions of each tile and producing rendered tiles; a transformation module for transforming the rendered tiles into processed tiles; and a construction module for constructing the frame from the processed tile.

In the third embodiment, there is provided a display processor for outputting an output frame to a display, the display processor comprising a frame module for reading data from a current frame buffer, at least one previous frame buffer and a movement vector; a frame generation module for generating the output frame from the data read by the frame module; and an output module for outputting the output frame to the display.

BRIEF DESCRIPTION OF THE DRAWINGS

Further features and advantages of embodiments will become apparent from the following description of preferred embodiments, given by way of example only, which is made with reference to the accompanying drawings in which like reference numerals are used to denote like features.

DETAILED DESCRIPTION OF CERTAIN INVENTIVE EMBODIMENTS

Details of methods, apparatus, and processors according to examples will become apparent from the following description, with reference to the Figures. In this description, for the purpose of explanation, numerous specific details of certain examples are set forth. Reference in the specification to 'an example' or similar language means that a particular feature, structure, or characteristic described in connection with the example is included in at least that one example, but not necessarily in other examples. It should further be noted that certain examples are described schematically with certain features omitted and/or necessarily simplified for ease of explanation and understanding of the concepts underlying the examples.

Figure 1:
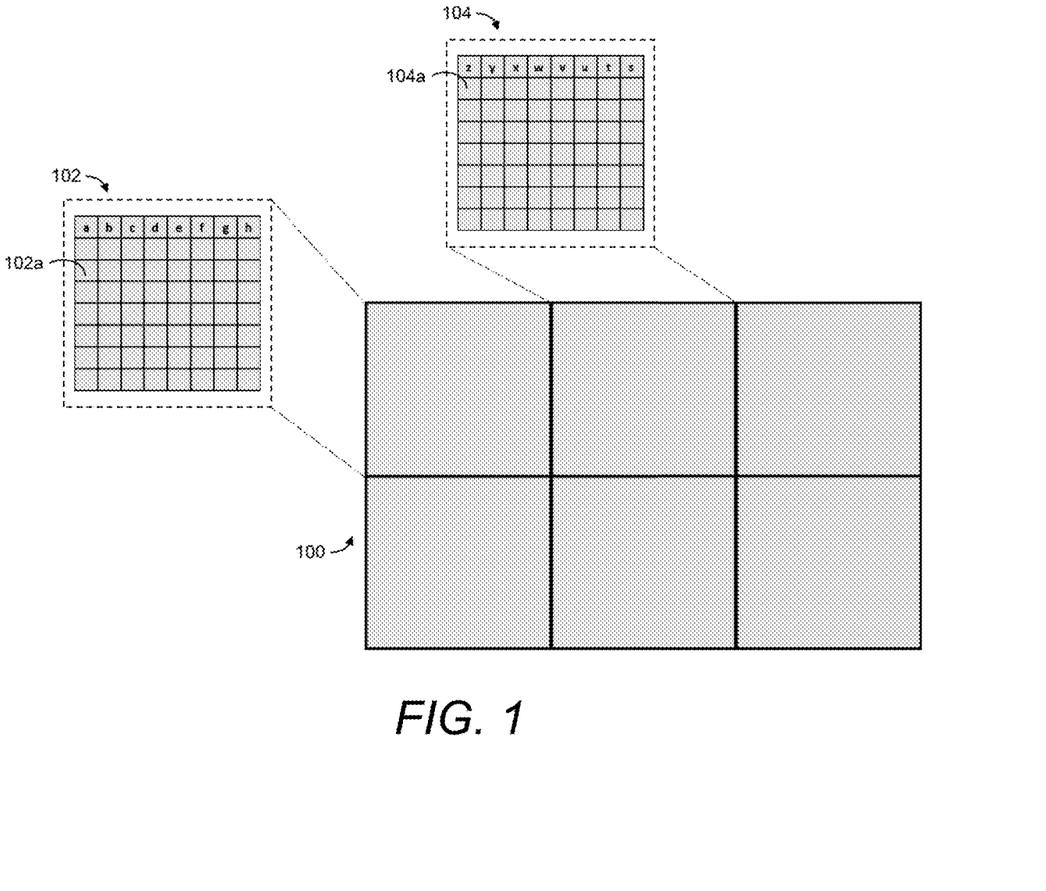
FIG. 1 is a representation of a frame subdivided into tiles.

FIG. 1 is a representation of a frame 100 subdivided into tiles 102,104. The representation of the frame 100 of FIG. 1 may be used by the methods shown in the flow diagrams of FIGS. 2, 3 and 5 described below, when executed on graphics processing units ('GPUs') arranged to render frames by subdividing them into tiles.

The representation of a frame 100 is subdivided into a plurality of tiles, for example tile 102 and tile 104. Each representation of a frame 100 is the same size as the frame to be rendered (not shown). However, it will be appreciated that representation may instead be representative of a predefined portion of the frame. The frame may, for example be a frame of video or a frame from a video game rendered at a high resolution, such as 4K (3840×2160 pixels). It will be appreciated that the representation of the frame 100 may comprise more than six tiles as shown in FIG. 1.

Checker board rendering is a method which can reduce the GPU compute requirements when rendering frames for high resolution displays, such as 4K. When rendering frames at such resolutions, and at relatively high frequencies, such as 60 Hz, the amount of computational power and energy required are particularly high.

Checker board rendering renders every other pixel in a frame. Motion vectors are then used to determine which pixels from a previous frame should be re-used in the un-rendered portion of the currently frame. In some embodiment, filtering may also be performed. Rendering every other pixel, therefore reduces the amount of computational power and resources required.

When using a checker board rendering technique on a tile-based GPU, each tile 102,104 is subdivided into a plurality of blocks, such as those at 102a, 104a, and each block is given a unique identifier (a . . . h; z . . . s). For the purpose of the Figures, only the first row of blocks show an identifier, however it will be appreciated that every block of the tiles is given a unique identifier. The number of blocks is dependent upon the tile size capable of being processed by the GPU. For example, an ARM® Mali Graphics Processing Unit ('Mali GPU') processes tiles with dimensions of 16 pixels by 16 pixels. As each tile-based GPU has a fixed tile size reducing the number of pixels that are required to be rendered, results in checker board rendering being inefficient as there are several pixels with no value. The methods described below in relation to FIGS. 2, 3 and 5 may be used to perform a checker board rendering technique on a tile-based GPU efficiently.

When using a checker board rendering technique, each block 102a, 104a is representative of a 2-pixel by 2-pixel area within the tile 102,104, although other sizes and aspect ratios for the area may be used. Therefore, when using a Mali GPU, for example, each tile is 8 blocks by 8 blocks, such as the tiles 102,104 shown in FIG. 1. Each tile 102,104 is processed as will be described below. All the processed tiles are then combined to produce a frame.

Figure 2:
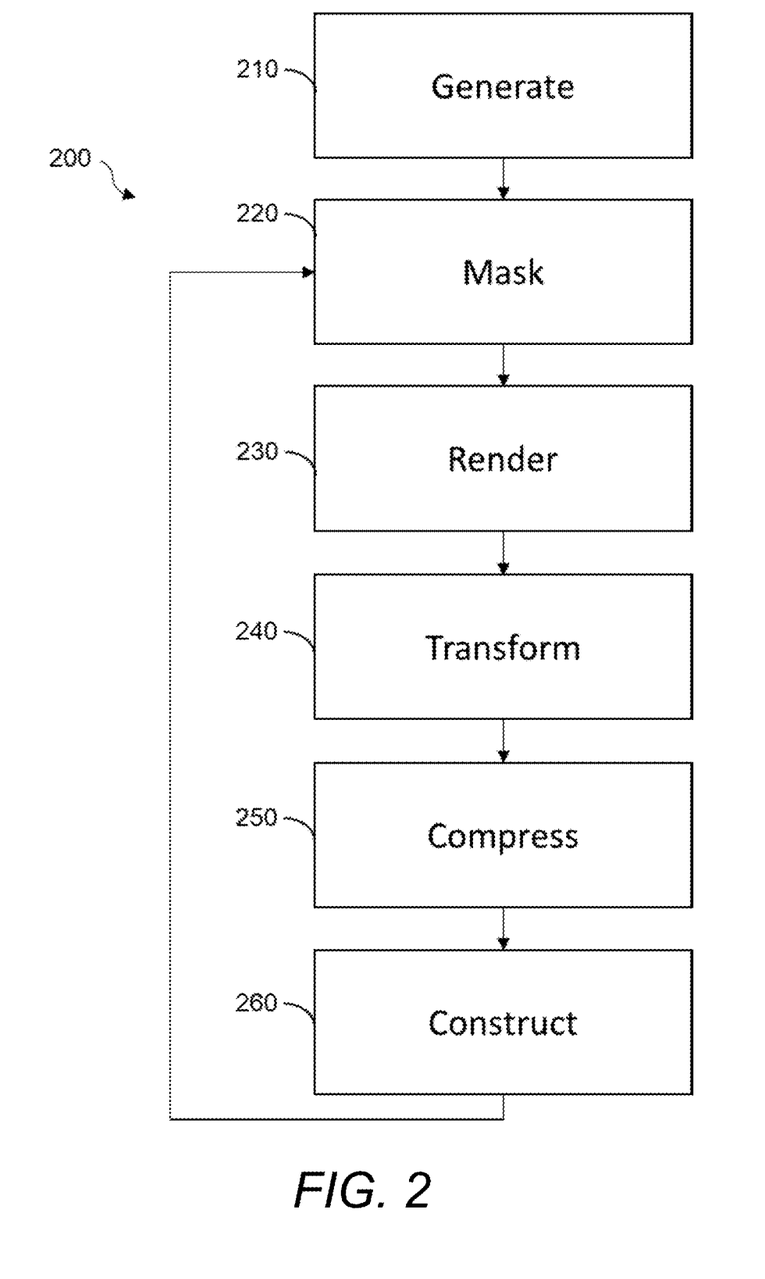
FIG. 2 is a flow diagram showing a method for producing frames according to examples.

FIG. 2 is a flow diagram showing a method 200 for producing frames according to examples. The method 200 may be implemented on a tile-based GPU for producing frames which minimize the computational resources and power required.

At item 210 of the method 200 of FIG. 2, a tile representation of the frame to be rendered is produced. As shown in FIG. 1, the tile representation of the frame comprises a plurality of tiles each representative of an area of the frame. For example, where the frame is a 4K image, and the image is to be rendered using a Mali GPU, as the Mail GPU renders tiles being 16 pixels by 16 pixels, the tile representation would comprise 32,400 tiles arranged in a grid 240 tiles by 135 tiles, each tile comprising 64 blocks in an 8 block by 8 block grid.

Once the tile representation has been generated the tile-based GPU begins processing each tile. At item 220, one or more predetermined blocks of the tile are eliminated. This may be achieved for example by applying a mask and/or stencil to the tile. The mask/stencil may be of any pattern, however when using a checker board rendering method, the mask is arranged to eliminate alternative blocks.

At item 230, the tile is rendered. Only those blocks of the tile which have not been eliminated are rendered. Rendering only the blocks which have not been eliminated may reduce the amount of processing required by 50%, as only half of the blocks contained within the tile are rendered. Blocks which have not been eliminated are rasterized conventionally. Furthermore, in some embodiments, each polygon, also known as a primitive, in the frame may be allocated an identifier so that its movement may be tracked over several frames, thereby providing a more accurate rendering, as will be discussed below in relation to FIGS. 7 and 8.

Once a tile has been rendered, it is transformed into a processed tile at item 240. In some embodiments, the transformation requires two tiles to have been rendered, other embodiments, as discussed below in relation to FIGS. 5 and 6, only require a single tile. During rendering, the tile-based GPU will generate a tile list indicating which polygons/primitives are located within a specific tile. For example, a GPU, such as the Mail GPU, which renders 16×16 tiles, will generate a 16×16 size tile list. When using two rendered tiles, the tile lists may be generated normally, and two tile list may then be combined in the tile buffer. As only those polygons/primitives that have been rendered and that are located within the tile are added to the tile list, this enables two tiles to be compressed and constructed as though they were a single tile, thereby enabling the tile-based processor to more efficiently process the tiles. Alternatively, the tile-based GPU may be arranged to process tiles having double the width of a standard tile. For example, the Mali GPU may be arranged to generate a double width tile list, that is a tile list which comprises 32 by 16 tile regions, this double width list is then sent to the tile buffer and does need to be combined with another tile list. This removes the requirement to render more than one tile before applying the transformation processes at item 250. When using this method with high resolution frames, such as 4K, this can improve the processing time and reduce the amount of processing power and energy required, especially at relatively high frequencies, such as 60 Hz, where large numbers of frames are required to be rendered each second. Processing two tiles at once therefore decreases the processing time required to render each frame.

At item 250, the transformed tile is compressed. Compressing the tile, reduces the amount of buffer storage required to produce an entire frame, by reducing the size of the tile writes further improves the amount of resources required to generate a frame. For example, the compression step may us an Arm® Frame Buffer Compression ('AFBC') algorithm, a lossless compression algorithm which reduces the amount of bandwidth and power required to transfer the block information between components of the system, for example to a display processor, as will be described below. It will be appreciated, that in some embodiments, the transformed tile may be written out uncompressed.

At item 260, the transformed and compressed tile is constructed. Construction comprises expanding the transformed tile, for example taking the 8 block by 8 block tile and expanding it back into two 8 block by 8 block tiles. The expansion reintroduces the un-rendered blocks which were removed during the transform step at item 240. The un-rendered blocks are those which were initially eliminated at item 220. The pixel values in each of the un-rendered blocks may be generated using motion vectors to determine which pixels from a previous frame should be re-used in the un-rendered portion of the currently frame. Once the tile constructed, and the un-rendered blocks' pixel values have been generated, the method loops, and performing the steps at items 220, 230, 240 250, and 260 for each of the remaining tiles.

The construction step may occur on the GPU, wherein each tile is constructed, and then the entire frame is written to a frame buffer to be read later by the display processor. Alternatively, as discussed below in relation to FIGS. 7 and 8, other information as well as the information of the neighbour blocks may also be used to generate the pixel values in each of the un-rendered blocks. The construction step may occur outside the GPU, for example in the display processor. In this embodiment, the compressed tiles generated at item 250 are written to memory to be read by the display processor later.

Figure 3:
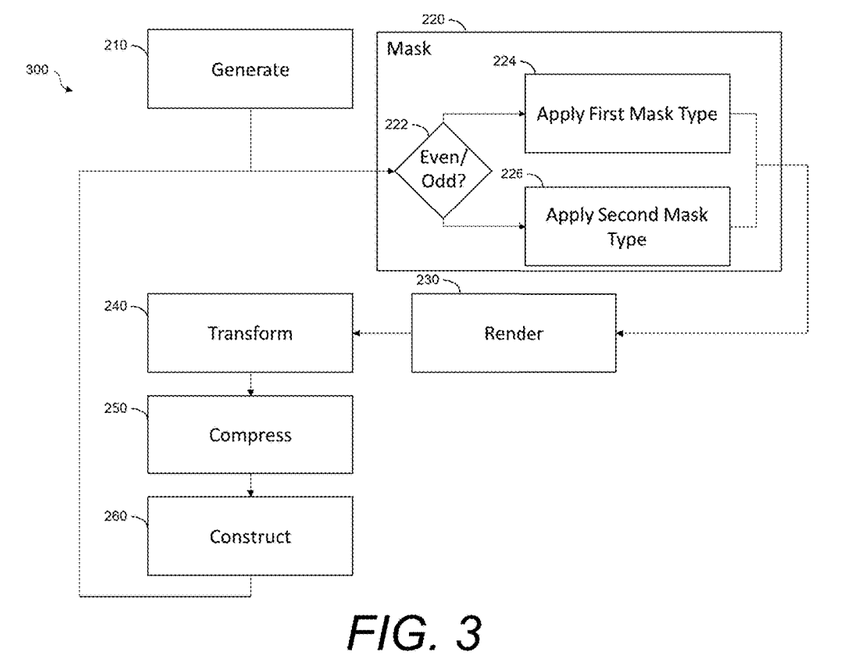
FIG. 3 is a flow diagram showing a second method for producing frames according to examples.

FIG. 3 is a flow diagram showing a second method 300 for producing frames according to examples. FIG. 3 shows a second method 300, wherein different portions of the tile are eliminated are applied depending on the frame number of a sequence of frames to be rendered. Items 210, 230, 240, 250, and 260 may be the same as in method 200 described above in relation to FIG. 2. However, at item 220, where portions of the tile are eliminated, additional method steps may be undertaken. At item 222, it is first determined whether the frame to be produced has an even or an odd frame number. If the frame to be produced is an odd numbered frame, a first set of blocks are eliminated, for example by applying a mask/stencil of a first type to the tiles at item 224. Conversely, if the frame to be produced is an even numbered frame, a second set of blocks are eliminated, for example by applying a mask/stencil of a second type to the tiles at item 226. Once either the required blocks have been eliminated, the method 300 progresses to item 230 and the method continues as discussed above in relation to FIG. 2. In some embodiments, it will be appreciated that the frame may be produced over more than two frames. For example, a frame may be produced over three frames, wherein the first frame generates a third of the pixels, a second frame generates a further third of the pixels, and a third frame produces the last third of the pixels. This would reduce the amount of processing even further.

For example, when using a checker board rendering method, a first mask/stencil may be a checker board configuration, and the second mask/stencil may be an inverse of that checker board configuration, an example of this is shown and described below in relation to FIG. 4. Furthermore, as will be described below in relation to FIGS. 7 and 8, using two masks/stencils where one is an inverse of the other enables a more efficient and accurate generation of the masked blocks during the construction step at item 260.

Figure 4:
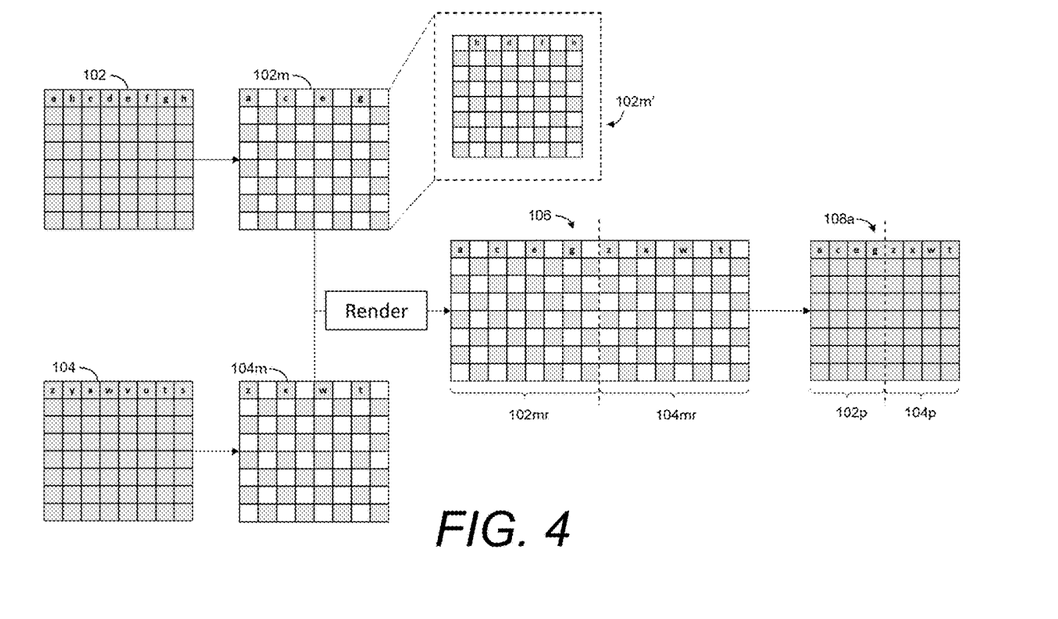
FIG. 4 shows an overview of the results of steps of the methods for producing frames shown in FIGS. 2 and 3.

FIG. 4 shows an overview of the results of steps of the methods 200,300 for producing frame shown in FIGS. 2 and 3. The overview shows two tiles 102,104, each tile comprising a plurality of blocks (a . . . h; z . . . s) as discussed above in relation to FIG. 1. Each tile 102,104 represents a predetermined portion of the frame 100 shown in FIG. 1.

Portions of each tile 102,104 are eliminated as described above in relation to step 220 of FIGS. 2 and 3. In this embodiment, as checker board rendering is being used, alternative blocks of the tile 102,104 are eliminated from processing. This results in a tile 102m,104m comprising half of the number of blocks for example, tile 102m comprises blocks with identifiers a, c, e, g and tile 104m comprises blocks with identifiers z, x, w, t.

In an alternative embodiment, such as that described above in relation to FIG. 3, different portions of the tile may be eliminated depending on the frame. For example, when using a mask/stencil to eliminate the portions of the tile, a first mask type may be applied to odd numbered frames, and a second mask type may be applied to even numbered frames. In the example shown in FIG. 4, tile 102m has a checker board mask applied, and tile 102m' has an inverse of the checker board mask applied. Using an inverse mask, especially in checker board rendering may improve the generation of the pixel values of eliminated blocks.

Once the predetermined blocks of the tiles 102m,104m have been removed, the retained blocks are rendered as discussed above, to produce rendered tile 102mr,104mr. The rendered tiles 102mr,104mr are then transformed. This involves first creating a double width tile 106, containing the rendered tiles 102mr,104mr positioned adjacently to one another. The double width tile 106 is then processed further and the un-rendered blocks are removed to produce a processed tile 108a. It will be appreciated that other aspect ratios or sizes may be processed, for example double depth tile, or a triple width or triple depth tile if a third of a frame is processed at one time. A first portion of the processed tile 108a comprises the rendered blocks 102p from tile 102m, and a second portion of the processed tile 108a comprises the rendered blocks 104p from tile 104m.

In some embodiments, it will be appreciated that the first step of the transformation process need not occur. Where possible, the GPU may process tiles having one dimension which is double the preferred tile size. For example, when using a Mali GPU, the tile size may be increased to 32 pixels by 16 pixels, therefore, when the tile is processed, and the un-rendered blocks are removed, the processed tile 108a will have the preferred dimensions, that being 16 pixels by 16 pixels.

The processed tile 108a is then forwarded for compression and construction as discussed above.

Figure 5:
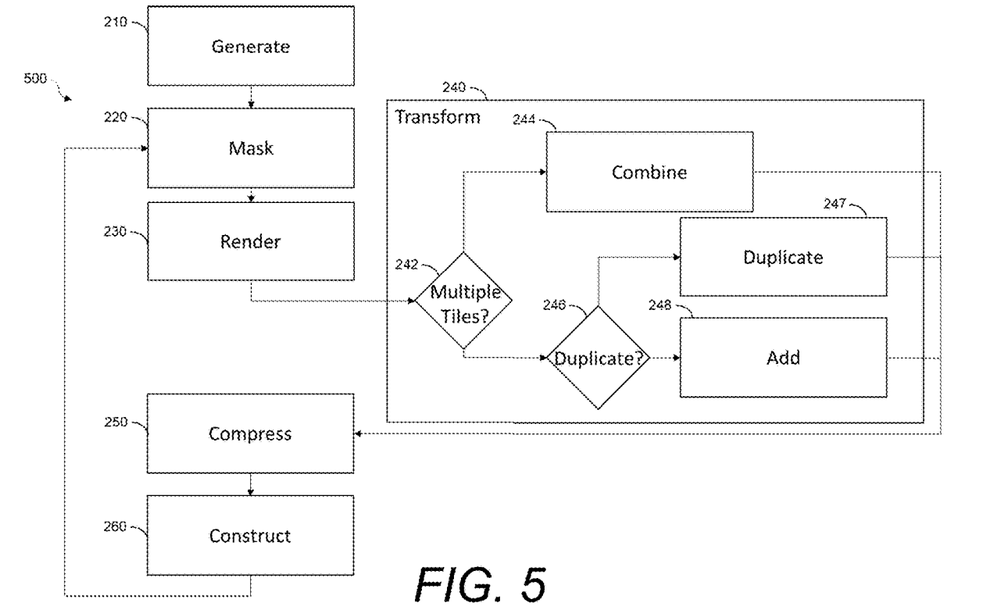
FIG. 5 is a flow diagram showing a third method for producing frames according to examples.

An alternative embodiment shown in FIG. 5 is a flow diagram showing a third method 500 for producing frames according to examples. FIG. 5 shows a third method 500 wherein different transformation algorithms are applied. Items 210, 220, 230, and 250 may be the same as in the method 200 described above in relation to FIG. 2. However, at item 240, where the rendered tile is transformed, additional method steps are undertaken. At item 242, it is first determined whether the method 500 is transforming multiple tiles of the frame to be produced. If so, at item 244, the two adjacent tiles are combined as discussed above in relation to item 240 of FIG. 2. In yet an alternative embodiment, the step at item 244 may also be used when the size of one dimension of each tile generated at item 210 is double that capable of being efficiently processed by the GPU. For example, when producing frames on the Mali GPU, the efficient tile size is 16 pixels by 16 pixels. Therefore, the step at item 244 may also be used when the tile representation generated at step 210 is 32 pixels by 16 pixels.

If the method 500 is being used on a processor which is not capable of processing tiles more than a single tile at once, or processing tiles whereby one dimension of the tile is double that capable of being processed by the GPU, the method 500 may proceed to item 246.

At item 246, there are two options for transforming the tile. Depending on the hardware available, there may be preference as to which option is used. At step 247, the rendered tile is transformed, removing the un-rendered blocks. This results in a tile one half the size in one dimension. For example, on the Mali GPU where the tile is 16 pixels by 16 pixels, removing the un-rendered blocks results in a transformed tile which is 8 pixels by 16 pixels. As tile-based GPUs are designed to process tiles most efficiently when they are a predetermined size, if the GPU were to process a tile having this dimension, this would result in inefficiencies. Therefore, at step 247, the data of the tile with the un-rendered blocks removed is duplicated. In the example mentioned above in relation to the Mali GPU, this results in a tile having the desired tile size (16 pixels by 16 pixels).

Alternatively, the method may proceed to item 248, whereby the rendered tile is transformed removing the un-rendered blocks. The remaining tile space is then filled with zero-value blocks, thereby ensuring the transformed tile has the desired tile size.

Once the tile has been transformed, as with method 200, in method 500 the tile is compressed. The compression step at item 250 may eliminate any overhead associated with the duplicated blocks or the zero-value blocks.

Once compressed at item 250, the tile will be constructed. As with item 250 of method 200, this requires interpolating the pixel values for each of the un-rendered blocks. However, as the tile comprises duplicated or zero-value blocks, then the transformation method used must be provided so that the block may be accurately constructed.

FIG. 5 shows an overview of the results of the steps of the third method of producing frames. The overview shows a single tile 102 comprising a plurality of blocks (a . . . h) as discussed above in relation to FIG. 1. The tile 102 represents a predetermined portion of the frame 100 shown in FIG. 1.

Figure 6:
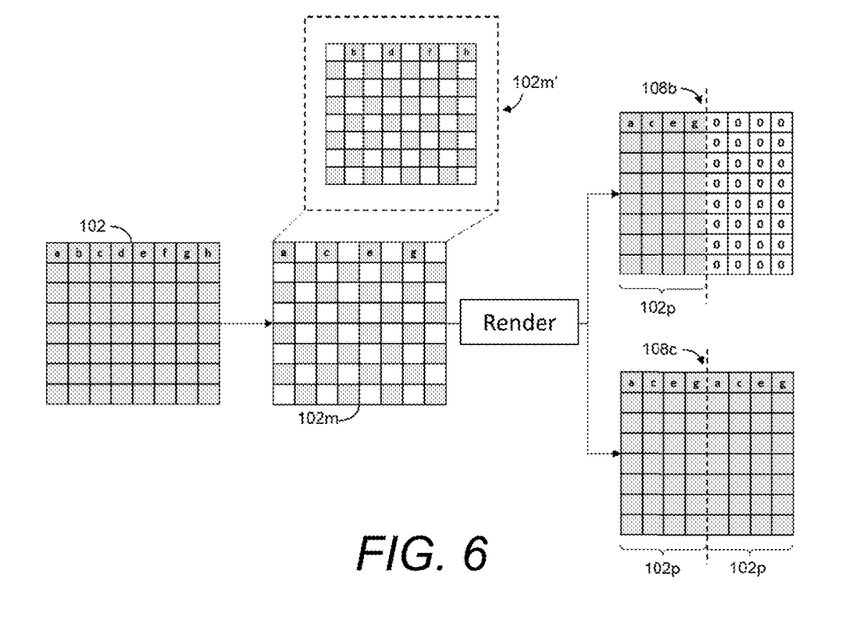
FIG. 6 shows an overview the results of steps of the third method of producing frames shown in FIG. 5.

The tile 102 is has predetermined blocks eliminated from it as is described above in relation to step 220 of FIG. 1. In this embodiment, as checker board rendering is being used, alternative blocks of the tile 102 are eliminated from processing. This results in a tile 102*m* comprising half of the number of blocks, for example as shown in FIG. 6, tile 102*m* comprises blocks with identifiers a, c, e, g.

In an alternative embodiment, such as that described above in relation to FIG. 3, different portions of the tile 102 may be eliminated depending on the frame. For example, as described above a first mask type may be applied to odd numbered frames, and a second mask type may be applied to even numbered frames. In the example shown in FIG. 6, tile 102*m* has a checker board mask applied, and tile 102*m*' has an inverse of the checker board mask applied. Using an inverse mask, especially in checker board rendering may improve the generation of the pixel values of eliminated blocks, as will be discussed below in relation to FIGS. 7 and 8.

Once the predetermined portions of the tile 102*m* have been eliminated, the retained blocks are rendered as discussed above, to produce a rendered tile (not shown). The rendered tile is then transformed. In this embodiment there are multiple options for transforming the rendered tile.

One option is to remove the un-rendered blocks, and then duplicate the rendered block data to produce a processed tile 108*c* of the desired dimensions. Therefore, the processed tile 108*c* comprises first and second portions having the same rendered block data 102*p*. For example, as shown in FIG. 6, the first row of the processed tile would comprise blocks with identifiers a, c, e, g, a, c, e, g.

An alternative option is to remove the un-rendered blocks, and then place zero-value data in the remaining blocks to produce a processed tile 108*b* of the desired dimensions. The processed tile 108*b* comprises a first portion with the rendered block data 102*p*, and a second portion with zero-value data. For example as shown in FIG. 6, the first row of the processed tile would comprise blocks with identifiers a, c, e, g, 0, 0, 0, 0.

The processed tile 108*b*, 108*c* is then forwarded for compression and construction as discussed above. During compression, details regarding the option taken to transform the tile may also be provided, this enables a more efficient construction of the tile, as it may aid reducing or eliminating any overheads associated with duplication of pixels and the addition of zero-value blocks.

Figure 7:
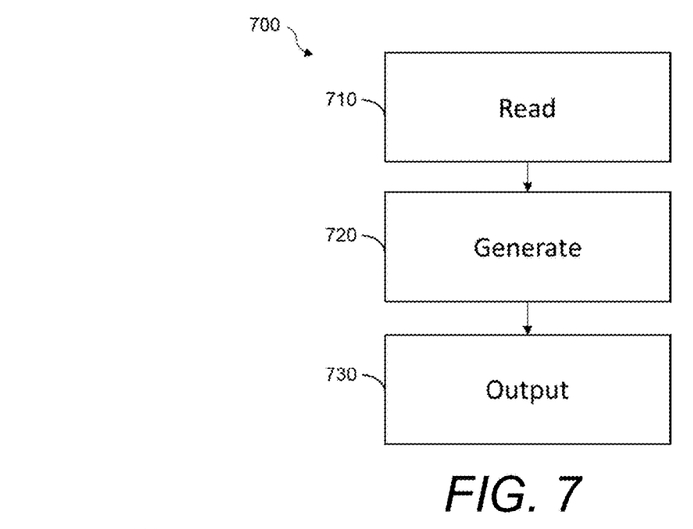
FIG. 7 is a flow diagram showing a method for outputting an output frame to a display according to examples.

FIG. 7 is a flow diagram showing a method 700 for outputting an output frame to a display according to examples. At item 710, data is read from memory associated with the generation of a frame. The data may comprise current frame data, previous frame data, and movement vector meta data associated with polygons in the rendered frame.

The current frame data may comprise data groups of transformed tiles such as 108*a*,108*b*,108*c* generated by the methods 200,300,500 described above in relation to FIGS. 2, 3, and 5. The previous frame data may comprise a version of the previous frame, and the movement vector meta data may comprise information related to the position of polygons within a rendered scene.

At item 720, when the data has been read from memory, the method 700 generates a version of the current frame. As mentioned above in relation to item 260 in FIGS. 2, 3 and 5, the generation of a frame comprises expanding the transformed tile 108*a*,108*b*,108*c* and generating pixel values for the previously eliminated blocks.

Using the previous frame data and movement vector meta data for each polygon within the frame, the pixel values for the previously eliminated blocks may be generated. The accuracy of the generation of the pixel values for the eliminated blocks may be improved when the previous frame data was generated using data which for example, was masked using an inverse of the mask of the current frame, as was described above in relation to method 300 shown on FIG. 3.

Once the frame data 844 has been generated, the values are outputted for display. The generated frame data 844 is also fed back for use when generating blocks which have been eliminate from tiles of the next frame.

Figure 8:
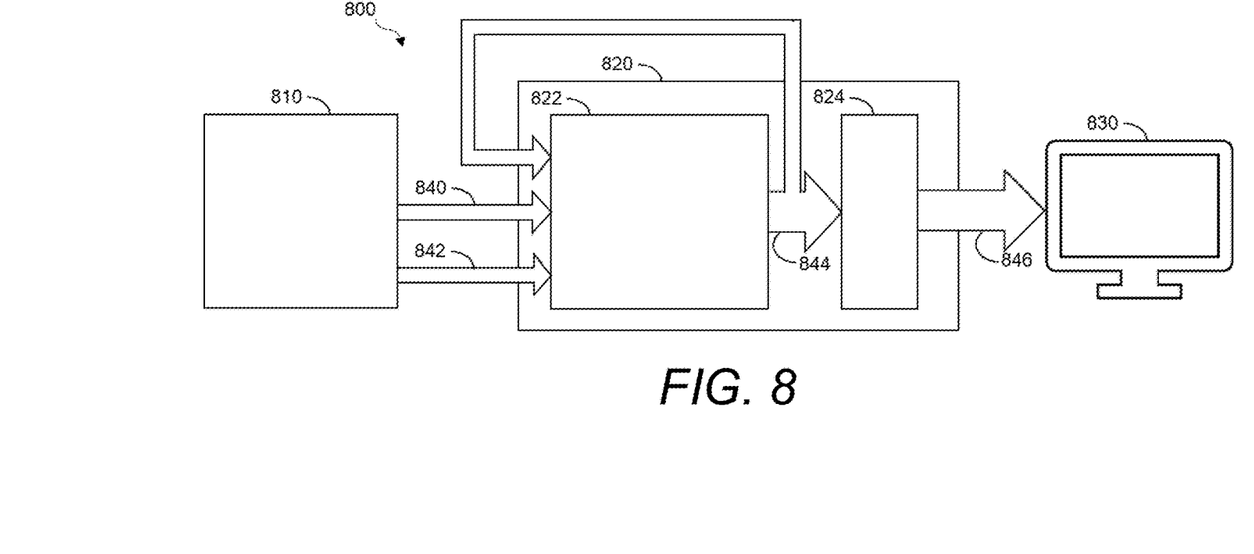
FIG. 8 shows schematically a system for generating and outputting frames.

FIG. 8 shows schematically a system 800 for generating and outputting frames according to examples. The system 800 comprises a processing unit 810, a display processor 820, and a display 830. The display processor 820 comprises a generation module 822 and storage 824. The storage 824 may be for example a random-access memory (RAM) such as DDR-SDRAM (double data rate synchronous dynamic random-access memory). In other examples, the storage 824 may be or include a non-volatile memory such a solid-state drive (SSD) such as Flash memory. The storage 824 may be removable or non-removable from the display processor 820, and in some embodiments may be external to the display processor 820.

The processing unit 810 may be a tile-based graphics processor, such as the Mali GPU. Alternatively, the processing unit 810 may be a more general processor, such as a central processing unit ('CPU') or an alternative processor such as a microprocessor, a general purpose processor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein.

In some embodiments, the processing unit 810 will render tiles, as discussed above in relation to FIGS. 1 through 6, wherein the rendered tiles have been transformed, and comprise only blocks which have not been eliminated. The transformed and rendered tile data 840, such as 108a, 108b, and 108c in FIGS. 4 and 6, are provided to the generation module 822 of the display processor 820. The processing unit 810 may also provide movement vector meta data 842 in relation to polygons within the frame, to the generation module 822.

Alternatively, the processing unit 810 may provide only movement vector meta data 842 to the generation module 822. Furthermore, the generation module 822 may be arranged to perform methods 200, 300, and 500 described above, thereby reducing the amount of computation required by the processing unit 810.

In addition to the current frame's transformed and rendered tile data 840, and the movement vector meta data, the generation module 822 may also receive previously generated frame data 844. The previously generated frame data 844 may comprise the data from a single previous frame, or alternatively comprise data from multiple previous frames.

The generation module 822 uses the previously generated frame data 844 and the motion vector meta data 842 to generate pixel values for the previously eliminated blocks in the current frame data 840.

Once the pixel values have been generated, the generation module 844 outputs the generated frame data 844 to storage 824. The display 830 then reads the contents of the storage 824 and displays the frame.

For example, when rendering a sequence of frames using the display processor 820, all pixels in the first frame are rendered by the processing unit 810, which outputs a full frame. The display processor 820 reads this frame and outputs it for display. The processing unit 810 then renders half the pixels for a second frame in the sequence, which is outputted as a half frame. The display processor 820 reads this half frame and the un-rendered pixels are generated using a checkerboard rendering technique using pixel information from the first frame, a second full frame is then outputted for display. Next the processing unit 810 renders half the pixels from a third frame, which is outputted as a half frame, the display processor 820 reads this half frame and the un-rendered pixels are generated using a checkerboard rendering technique using pixels from the rendered first frame and rendered second half frame, a third full frame is then outputted for display.

Undertaking the construction of the tiles to produce a frame in the display processor 820, reduces the number of frame read and write actions required for each image. This helps to reduce the amount of external traffic to/from the storage and reduce power consumption.

It will be appreciated that the display processor 820 may output the generated frames directly from the generation module 822 to a standard display 830, or even an augmented reality device or virtual reality headset, without first writing the generated frames to the storage 824.

The components of the system 800 may be interconnected using a systems bus (not shown). This allows data to be transferred between the various components. The bus may be or include any suitable interface or bus. For example, an ARM® Advanced Microcontroller Bus Architecture (AMBA®) interface, such as the Advanced eXtensible Interface (AXI), may be used.

The order of processing steps in the examples described above are merely examples. In other examples, these processing steps may be performed in a different order. For example, the transform steps at items 240 of methods 200, 300 and 500 shown in FIGS. 2, 3, and 5 may be performed prior to rendering the unmasked blocks.

It will be appreciated that the methods and apparatus described above may be used as part of a frame rendering technique employed by a processing unit. For example, the method described may be combined with other techniques to drive further efficiencies in the rendering of high resolution frames. One such technique may be foveated rendering in a virtual reality environment. When used with a foveated rendering technique, the processing unit may render areas which the user is focused on. The peripheral regions may then be rendered using the techniques described above. This may provide an optimal resolution image where the user is focused, whilst efficiently managing resources and computational power by rendering the peripheral regions using a more computationally efficient method.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. A method of producing a frame using a tile-based graphics processor for output to a display, comprising:
    generating a tile representation of the frame, wherein the tile representation comprises a plurality of tiles each associated with an area of the frame, each said tile being of a fixed size and comprising a plurality of portions;
    eliminating one or more of the plurality of portions of each tile;
    rendering retained portions of each tile to produce rendered tiles;
    transforming the rendered tiles into processed compressed tiles;
    outputting the processed compressed tiles to memory for display,
    constructing the frame from the processed compressed tiles; and
    outputting the constructed frame to a display;
    wherein transforming the rendered tiles into processed compressed tiles comprises combining at least two rendered tiles by combining the data associated with each of the rendered tiles into a processed tile of the fixed size.

2. The method of producing a frame according to claim 1, wherein the portions comprise a plurality of blocks of pixels.

3. The method of producing a frame according to claim 2, wherein the blocks of pixels are two pixels wide by two pixels tall.

4. The method of producing a frame according to claim 1, wherein the step of eliminating one or more predetermined portions of each tile comprises applying a stencil having a checkerboard pattern, arranged to eliminate alternating blocks of pixels.

5. The method of producing a frame according to claim 1, wherein the step of transforming the rendered tiles comprises augmenting the at least two rendered tiles with zero value blocks.

6. The method of producing a frame according to claim 1, wherein the step of transforming the rendered tiles comprises replicating data from one of the at least two rendered tiles.

7. The method of producing a frame according to claim 1, further comprising the step of compressing the processed tiles.

8. The method of producing a frame according to claim 7, wherein the step of compressing the processed tiles comprises applying a lossless compression algorithm to the processed tiles.

9. The method of producing a frame according to claim 7, wherein the step of compressing the processed tiles comprises applying an Arm Frame Buffer Compression algorithm to the processed tiles.

10. The method of producing a frame according to claim 1, wherein the step of constructing the frame comprises applying a checker board rendering technique to determine pixel values for the one or more eliminated portions of the tile.

11. The method of producing a frame according to claim 1, further comprising applying the method to produce subsequent frame comprising a plurality of tiles each associated with an area of the frame.

12. The method of producing a frame according to claim 11, wherein the step of eliminating the one or more predetermined portions of the tile comprises applying a stencil to the plurality of tiles of the subsequent frame that is the inverse of a stencil applied to the plurality of tiles of the frame.

13. An apparatus for producing a frame using a tile-based graphics processor for output to a display comprising:
  a generation module for generating a tile representation of the frame, wherein the tile representation comprises a plurality of tiles each associated with an area of the frame, each said tile being of a fixed size and comprising a plurality of portions;
  an elimination module for eliminating one or more of the plurality of portions of each tile;
  a rendering module for rendering retained portions of each tile and producing rendered tiles;
  a transformation module for transforming the rendered tiles into processed compressed tiles;
  a first output module for outputting the processed compressed tiles to memory for the display,
  a construction module for constructing the frame from the processed compressed tiles; and
  a second output module for outputting the constructed frame to the display,
  wherein transforming the rendered tiles into processed tiles comprises combining at least two rendered tiles by combining the data associated with each of the rendered tiles into a processed tile of the fixed size.

14. The apparatus for producing a frame according to claim 13, further comprising a compression module for compressing the processed tiles.

15. The apparatus for producing a frame according to claim 13, wherein the construction module forms part of a display processor.

* * * * *